United States Patent
Gupta et al.

(10) Patent No.: US 11,088,932 B2
(45) Date of Patent: Aug. 10, 2021

(54) MANAGING NETWORK SYSTEM INCIDENTS

(71) Applicant: International Business Machines Corporation, Armonk, NY (US)

(72) Inventors: Manish Gupta, New Delhi (IN); Kelly Ann Washburn, Naugatuck, CT (US); Rajeev Puri, Huntersville, NC (US)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 16/600,625

(22) Filed: Oct. 14, 2019

(65) Prior Publication Data

US 2021/0111980 A1 Apr. 15, 2021

(51) Int. Cl.
*G06F 15/173* (2006.01)
*H04L 12/26* (2006.01)

(52) U.S. Cl.
CPC .......... *H04L 43/14* (2013.01); *H04L 43/0817* (2013.01); *H04L 43/12* (2013.01); *H04L 43/50* (2013.01)

(58) Field of Classification Search
CPC ..... H04L 43/14; H04L 43/0817; H04L 43/12; H04L 43/50
USPC ........................................................ 709/224
See application file for complete search history.

(56) References Cited

U.S. PATENT DOCUMENTS

| | | | |
|---|---|---|---|
| 8,301,613 B2 | 10/2012 | Grabarnik | |
| 2012/0072781 A1 | 3/2012 | Kini | |
| 2015/0142508 A1 | 5/2015 | Buck | |
| 2016/0357620 A1 | 12/2016 | Beasley | |
| 2018/0276063 A1 | 9/2018 | Mendes | |
| 2018/0314947 A1* | 11/2018 | Morris, II | G06N 7/005 |
| 2018/0375719 A1 | 12/2018 | Bouz | |
| 2020/0067789 A1* | 2/2020 | Khuti | G06F 16/88 |
| 2020/0175439 A1* | 6/2020 | Abu El Ata | G06N 7/005 |
| 2020/0278273 A9* | 9/2020 | Shapiro | G06Q 10/04 |

FOREIGN PATENT DOCUMENTS

| | | | |
|---|---|---|---|
| WO | 2017102629 A1 | 6/2017 | |
| WO | 2019095374 A1 | 5/2019 | |

OTHER PUBLICATIONS

Mell et al., "The NIST Definition of Cloud Computing", Recommendations of the National Institute of Standards and Technology, Special Publication 800-145, Sep. 2011, 7 pages.
Mukhopadhyay, Ayan, "Incident Prediction and Response Optimization", Doctoral Submission, Doctoral Consortium, AAMAS 2018, Jul. 10-15, 2018, Stockholm, Sweden, pp. 1758-1760.

* cited by examiner

*Primary Examiner* — Alan S Chou
(74) *Attorney, Agent, or Firm* — David K. Mattheis; Maeve M. Carpenter

(57) ABSTRACT

Managing network asset incidents by receiving historical network asset incident data, analyzing the historical network asset incident data to correlate incident occurrence, receiving real time network asset incident data, generating a list of network assets predicted to be affected by a real time incident, in response to receiving the real time network asset incident data, monitoring the list of network assets, and remediating a network incident for a listed network asset.

15 Claims, 4 Drawing Sheets

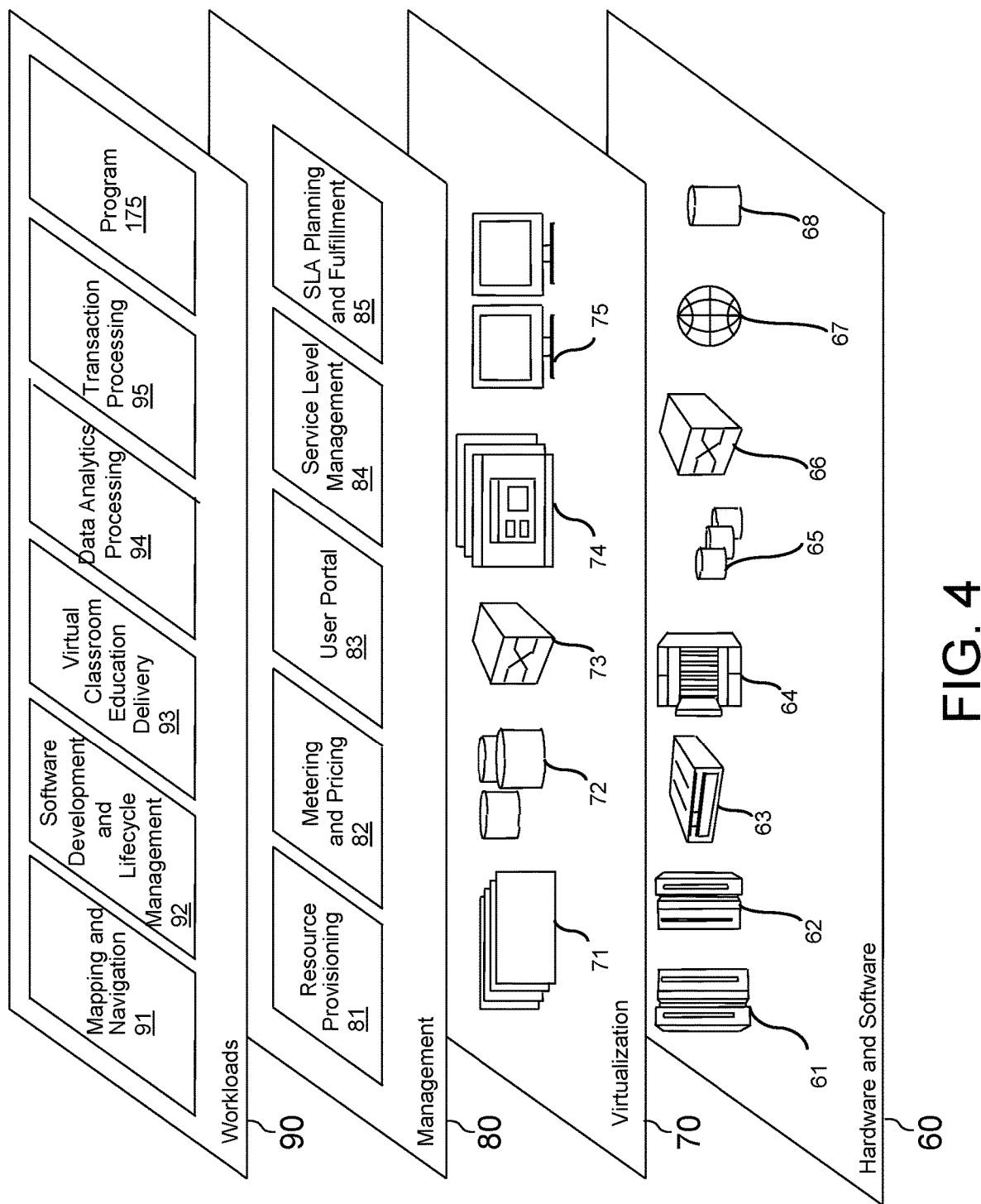

MANAGING NETWORK SYSTEM INCIDENTS

BACKGROUND

The disclosure relates generally to managing application, infrastructure and network asset incidents. The disclosure relates particularly to managing incident cascades among network assets.

Multi-cloud systems and application include hardware and software components which are entangled in numerous ways. Incidents involving one component may create a cascade, daisy-chain, or ripple effect of additional incidents among entangled components. Network component incidents are typically addressed and resolved by system administrators through actions targeting only the initial component incident.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products manage incident cascades among networked assets.

Aspects of the invention disclose methods, systems and computer readable media associated with managing network asset incidents by receiving historical network asset incident data, analyzing the historical network asset incident data to correlate incident occurrence, receiving real time network asset incident data, generating a list of network assets predicted to be affected by a real time incident, in response to receiving the real time network asset incident data, monitoring the list of network assets, and remediating a network incident for a listed network asset.

BRIEF DESCRIPTION OF THE DRAWINGS

FIG. 4 depicts abstraction model layers, according to an embodiment of the invention.

DETAILED DESCRIPTION

Figure 1:
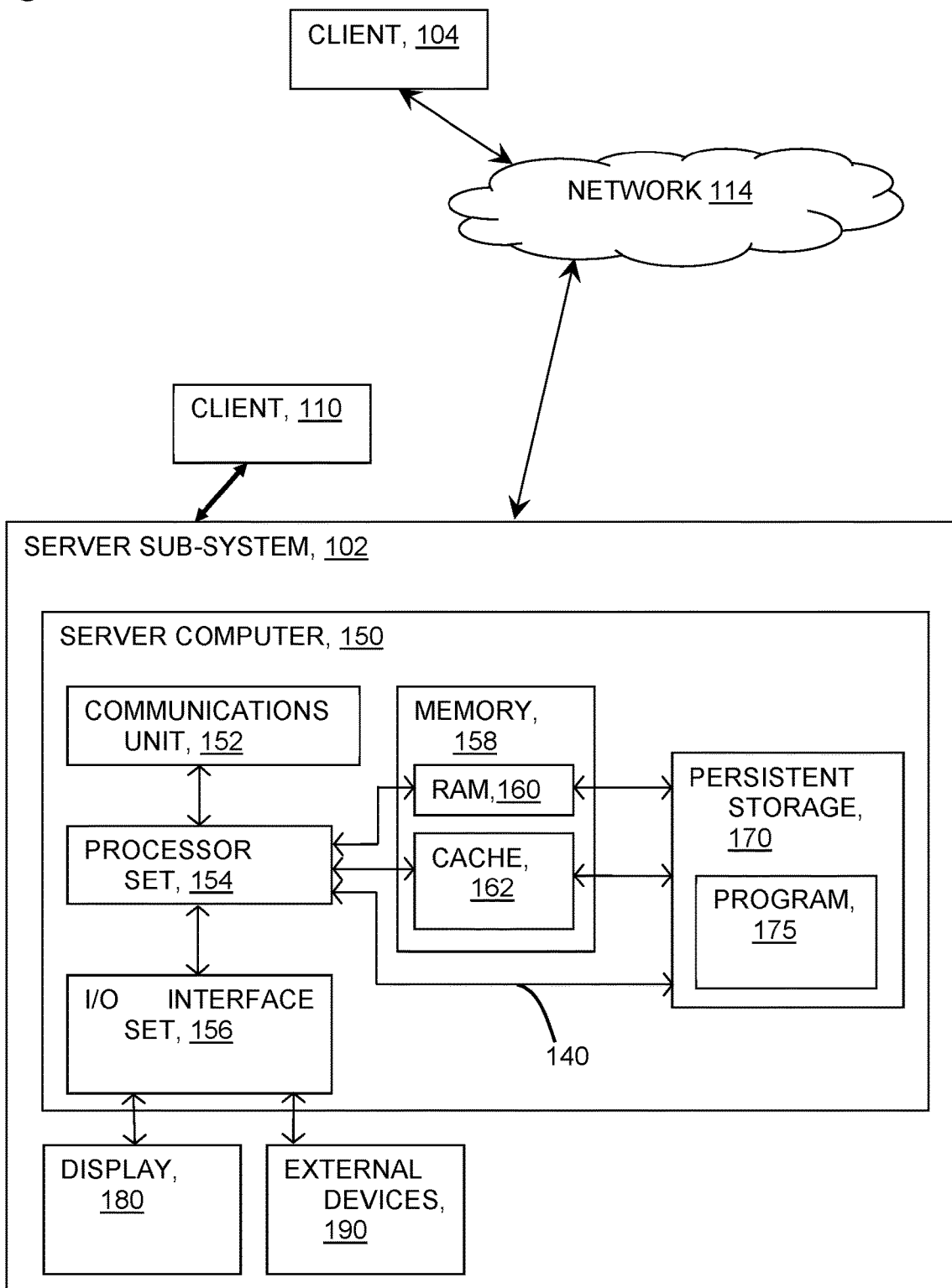
FIG. 1 provides a schematic illustration of a system, according to an embodiment of the invention.

In an embodiment, one or more components of the system can employ hardware and/or software to solve problems that are highly technical in nature (e.g., analyzing historical network asset incident data to correlate incident occurrence, generating a list of network assets predicted to be affected by a real time incident, monitoring the list of network assets, remediating a network incident for a listed network asset, etc.). These solutions are not abstract and cannot be performed as a set of mental acts by a human due to the processing capabilities needed to facilitate endpoint device remediation, for example. Further, some of the processes performed may be performed by a specialized computer for carrying out defined tasks related to memory operations. For example, a specialized computer can be employed to carry out tasks related to endpoint device remediation or the like.

Networked multi-cloud environments include numerous hardware (servers, routers, end point machines) and software (containers, nodes, clusters, applications, incident logs, etc.). These components may be independent but are more likely to be entangled with each other. An incident with a first system hardware or software component can lead to a cascade of additional incidents as the effects of the initial incident spread across the networked system of components.

Administrative efforts to address an initial incident typically proceed by addressing the immediate effects of the incident and without regard for any longer term, or secondary incidents which the initial, primary incident may cause. Efforts to link a primary incident to secondary incidents using analysis of historical incident data, including system incident ticketing logs, may yield false positives and false negatives in the identified links due to an over reliance upon historical data. What is needed is system and method which will combine an analysis of historical incident data with real-time system performance data to accurately predict system components most likely to be subject to a secondary incident after the occurrence of a primary incident. The desired system and method should alert system administrators to the predicted future incidents and provide options for addressing the secondary incidents. The options should include preventative actions as well as incident response actions for instances where prevention is not possible, or the secondary incident has already occurred.

Primary—secondary network component incidents may include a network problem (router issue) which then leads, after a time interval (e.g., 45 minutes), to a disk full problem in a disk served by the affected network, which then leads, after a time interval (e.g., 10 minutes), to a log full incident in a log associated with the full disk, or an inability for the log to clear itself by transferring log entries to the full disk. Such incidents are linked by an indirect linkage and entanglement between system components which interact. Such linked incidents are differentiated from primary—subsidiary, wherein a primary problem (network host not responding—host failure) leads to subsidiary incidents (all applications hosted by the failed host generating incidents) directly from the primary incident due to a direct relationship between the subsidiary entity and the primary entity. The disclosed systems, method and computer program products address primary—secondary incidents between entities that are less directly linked.

In an embodiment, a primary incident (host failure, router failure, disk failure, component failure in a multi-tier application, failure in an on-premise component leading to a cloud incident, a primary failure in a component running on one cloud leading to failures in one or more components running on another cloud, etc.), occurs and is recorded in a system's incident logs, incident ticketing system, maintenance response system, etc. In this embodiment, the disclosed method responds to notice of the primary incident by identifying the other system components most likely to be adversely affected by the primary incident. In this embodiment, the identified components may be linked to the primary incident through historical incident data or the identified components may be identified as system essential components. The method executes playbook scripts to monitor the activities of the identified components. Based upon analysis of prior secondary incidents, the method predicts secondary incidents associated with the identified and monitored components according to the current monitored activities. In this embodiment, the method provides remediation scripts created to prevent the predicted incident or reduce the severity of the predicted incident's impact upon the system. In this embodiment, the method monitors the accuracy of its predictions and uses the monitored accuracy as feedback to improve the accuracy of future predictions and to reduce the component monitoring needs associated with future incidents.

In an embodiment, the method proceeds by receiving historical data relating to incidents in the multi-cloud network environment. The data may relate incidents involving configuration items ($C_i$) microservices, containers, servers, routers, disks, clusters, nodes, incident logs, etc. In this embodiment, the historical data is analyzed to correlate secondary incidents with primary incidents.

In an embodiment, the method analyzes the historical data looking for direct links between $C_i$. In this embodiment, the method evaluates a first tier of linkages between affected $C_i$. As an example, a primary incident K affects $C_{i\_a}$. The method determines that $C_{i\_a}$ and $C_{i\_b}$ are each affected by a second incident M, which occurs after incident K. The method links primary incident K with secondary incident M, due to the linkage between $C_{i\_a}$ and $C_{i\_b}$. In evaluating a second tier of incidents, the method identifies tertiary incident N, affecting $C_{i\_b}$ and $C_{i\_c}$, which occurs after incident M. The method links incidents N and M, due to the presence of $C_{i\_b}$ in the set of affected $C_i$ for each of the two incidents. In this embodiment, the method further links incident N with K and M through the linkage chain: $C_{i\_a}$-$C_{i\_b}$-$C_{i\_c}$.

In this embodiment, the method calculates the frequency f1, of the combinations $C_{i\_a}$ and $C_{i\_b}$, across the multi-cloud environment. In this embodiment, the method determines the frequency as the total number of incident M occurrences divided by the total number of secondary occurrences linked to $C_{i\_a}$. Similarly, the method calculates a second $C_{i\_c}$ frequency f2, as the total number of incident N occurrences divided by the total number of tertiary incidents linked to $C_{i\_b}$. In this embodiment, the method then assigns frequency f1 to the likelihood of incident M occurring after incident K, and the product of f1*f2, to the likelihood of incident N occurring after incident L.

In an embodiment, the method calculates the frequency f1 as the total number of occurrences of the combinations of $C_{i\_a}$ and $C_{i\_b}$ divided by the total of all combinations including $C_{i\_a}$, and frequency f2 as the total number of occurrences of the combination of $C_{i\_b}$ and $C_{i\_c}$ divided by the total of all combinations including $C_{i\_b}$.

In an embodiment, the method analyzes the historical incident data according to incident timelines and analysis windows. In this embodiment, the method evaluates incidents occurring in a time window T, following a primary incident L. The method identifies the $C_{i\_a}$ associated with L, and all incidents within window T immediately after the occurrence of L. For each unique $C_{i\_x}$ occurring within the window T, the method then calculates a frequency of occurrence for the $C_{i\_x}$ within the time window T. As an example, the method identifies new incidents M, and N, occurring within window T. M is associated with $C_{i\_b}$, and N is associated with $C_{i\_b}$, and $C_{i\_c}$. The method calculates frequency µ1 for $C_{i\_b}$ as the number of incidents associated with $C_{i\_b}$ divided by the total number of incidents in window T following L. The method calculates frequency µ2 as the number of incidents associated with $C_{i\_c}$ divided by the total number of incidents in window T following L.

In an embodiment, the method uses a dependency model to analyze the historical data. In this embodiment, for each primary incident, the method evaluates all data flows through $C_{i\_a}$ affected by the primary incident. The method then calculates a first strength for each secondary node $C_{i\_x}$ directly sending or receiving data through the $C_{i\_a}$ associated with the primary incident. The method calculates the strength for each secondary node as the total data volume in and out from the affected $C_{i\_a}$ to each $C_{i\_x}$ directly touching the affected $C_{i\_a}$, divided by the total data volume in and out of the affected $C_{i\_a}$. The method calculates a second strength for each tertiary node $C_{i\_y}$ sending or receiving data through the secondary $C_{i\_x}$ in direct contact with the affected $C_i$. In this embodiment, the method may calculate additional tertiary and quaternary etc., strengths associated with additional cascades of incidents across the multi-cloud environment. In an embodiment, a system user defines a number of tiers of strengths for the method to calculate. The number of tiers defined by the user can be chosen according to the complexity and degree of entanglements of the $C_i$ of the system. Higher numbers of tiers are defined for systems which are more complex and entangled.

In an embodiment, the method uses one or more of the historical linkage frequencies, historical timeline frequencies, and dependency model strengths to calculate weights (or likelihoods) for the occurrence of a secondary incident involving a specific $C_i$ after the occurrence of an incident involving a different specific $C_i$—e.g., the likelihood of a secondary incident for $C_{i\_b}$, after a primary incident for $C_{i\_a}$. In some embodiments the method uses a combination of the frequencies and strengths. In some embodiments only the frequencies are used. In some embodiment, only the strength is used and, in some embodiments, only one of the linkage or timeline frequency is used.

In an embodiment, the likelihood L, that a $C_i$ will be affected by a secondary incident after the occurrence of a primary incident, is calculated based on the different sources of strengths similar or the same as those discussed above as L:=min(1, $\max_i L_i + \Pi_i L_i$), i.e., the minimum of the set of 1, the maximum value of $L_i$, and the product of all $L_i$, where $L_i$ is the frequency or strength of the ith method used to evaluate the historical incident data.

Beyond the analysis of the historical data, the method includes identifying some system $C_i$ as essential. Essential $C_i$ may be specified by a system user or can be identified by the method as part of a real time activity feedback loop.

In an embodiment, after the method has calculated likelihoods associated with historical incident data for the $C_i$ of the system, and identified the essential $C_i$, the method receives real time data associated with system incidents. For each real time incident, the method determines the $C_i$ affected by the incident and identifies the system $C_i$ predicted as most likely—as determined by relative likelihoods—to be subjected to a secondary incident.

In this embodiment, for each predicted $C_i$ determined according to its likelihood to be affected by a secondary incident, or considered essential, the method executes playbook scripts to monitor the real time activities of the predicted and essential $C_i$. Playbooks are incident and $C_i$ type specific scripts generated manually and stored in a playbook repository, database, for use. Playbook scripts may gather data such as $C_i$ operational data, performance data, incident logs, network interactions, network status, $C_i$ configuration data, etc. In an embodiment, playbook scripts are pre-screened to ensure that the scripts will successfully monitor and report out the real time activity of each type of Ci. After generating a listing of predicted and essential $C_i$, the system selects the playbooks associated with the predicted and essential $C_i$ types, from the database. The method executes the playbook scripts, monitoring and reporting the activities of the predicted and essential $C_i$. In an embodiment, the method identifies more than a single playbook script to run to monitor a single $C_i$. As an example, each $C_i$ type playbook has a defined time window during which the playbook runs monitoring the $C_i$. As primary incidents occur, multiple playbooks may be identified for a specific $C_i$ incident type, for execution during overlapping time windows. The system user defines the time windows for each incident $C_i$ type playbook. In an embodiment, the method refines an initial time window setting according to accumulated historical incident data and successful incident predictions. As an example, the method may generate an incident prediction based upon timeline data analyzed using too large a timeline window. This may result in the prediction of incidents which do not occur. Over time the method will reduce the time window associated with both the historical timeline analysis and the associated incident playbooks.

In an embodiment, a single primary incident for a specific first $C_i$ leads to multiple secondary incidents for a second $C_i$, the different secondary incidents associated with differing system and second $C_i$ conditions at the time and shortly after the primary incident. In this embodiment, the method selects and runs multiple playbooks to monitor the second $C_i$.

In an embodiment, the method uses the data gathered from the playbook(s) execution to define a current state for each monitored $C_i$. The state of each $C_i$ may change as more data is gathered from the playbook(s) execution. For each state s, of the $C_i$, the method calculates a quality $Q(s,p_i)$, for each potential predicted incident $p_i$. In this embodiment, each state s, is associated with multiple predicted incidents. (In an embodiment, each state may be associated with a single predicted incident.) In this embodiment, the quality value for each state-prediction combination is between 0 and 1.

In an embodiment, quality is calculated as a combination of an analysis factor A and a feedback factor G. In an embodiment, the analysis factor is determined using analysis of real time data gathered by the playbook(s) and correlated with the occurrence of secondary incidents (incident log sizes above a determined threshold A=1, where the threshold is determined from previous occurrences of the incident type for elevated incident log sizes). In this embodiment, the feedback factor G, is determined according to accurate previous prediction of the $p_i$. In an embodiment, A and G are combined using $Q(s,p_i)=\alpha A+(1-\alpha)G$. Other functions combining A and G are also possible. In an embodiment, Q values for numerous previous state s determinations may be combined as a smoothing function to reduce the effect of any single previous Q determination on a current, real time calculation.

In an embodiment, the method forwards state s and prediction $p_i$ combinations with quality values above a threshold, the system user/administrator as the current predictions. In this embodiment, the current predictions are updated continuously based upon time windows and new primary incident occurrences. When a $C_i$ is in a given state s then we may limit the number of predictions $p_i$ to the top-n in terms of the $Q(s,p_i)$. In an embodiment, the method also forwards remediation recommendations and/or programming scripts for the administrator to apply to the $C_i$ predicted to be affected by a secondary incident. In this embodiment, the administrator selects one or more scripts for execution to remediate or in some instance, prevent the secondary incident from occurring.

In an embodiment, the method uses feedback loops to revise the model in terms of the $C_i$ identified as essential and the $C_i$ identified as needing playbook script-based monitoring for a given primary incident. In one embodiment, the method assigns a lifetime value to each essential and predicted $C_i$ for a given primary incident. In one embodiment, the method assigns a lifetime value of 2 to each of the $C_i$. The method then tracks the accuracy of predictions associated with these $C_i$. In this embodiment, the method decrements the lifetime of each $C_i$ for which a predicted incident fails to occur. $C_i$ having a lifetime decremented to 0 are removed from the essential list for the given primary incident. In this embodiment, $C_i$ affected by accurately predicted secondary incident are added to the essential $C_i$ list, with a lifetime of x, usually 2. The feedback function G, for these $C_i$, state, prediction combinations is set to 1. In this embodiment, $C_i$, spared the effects of an accurately predicted secondary incident by the administrator acting in response to the prediction, are added to the essential $C_i$ list with a lifetime of x, again, usually 2, and the feedback factor G, of these $C_i$ is set to 1.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise incident prediction program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the incident prediction program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., incident prediction program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
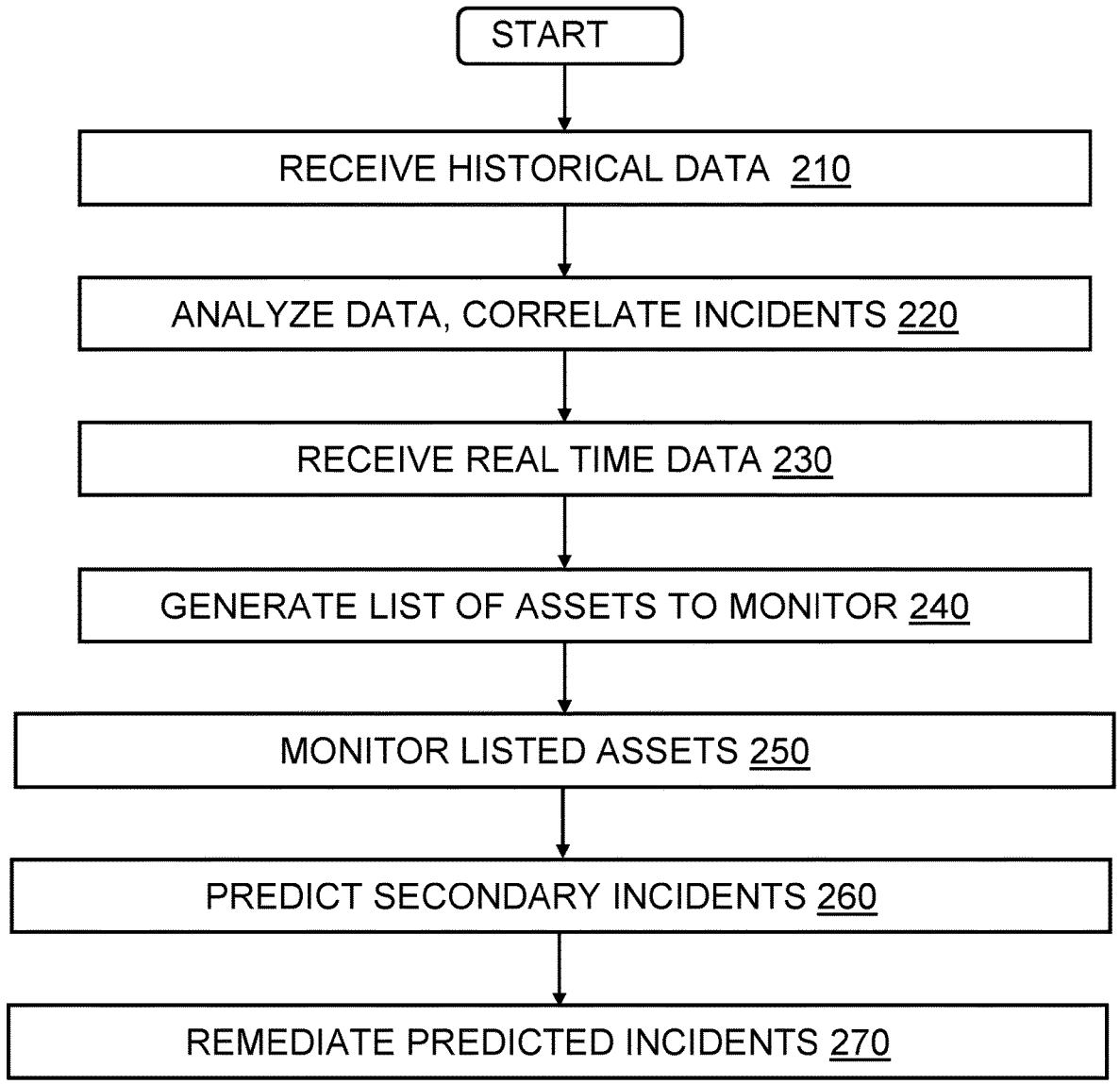
FIG. 2 provides a flowchart depicting an operational sequence, according to an embodiment of the invention.

FIG. 2 provides a flowchart 200, illustrating exemplary activities associated with the practice of the disclosure. After program start, program 175 receives historical incident data at 210. At 220, program 175 analyzes the historical system configuration item incident data. In an embodiment, program 175 utilizes one or more of system linkage analysis, incident timeline analysis, and configuration item dependency model analysis, to analyze the historical data. At 203 program 175 receives real time system incident data including system incident logs and ticketing module data. At 240, program 175 uses the results of the historical data analysis to generate a listing of $C_i$ to monitor using one or more playbook scripts at 250. In an embodiment, program 175 further monitors a listing of essential $C_i$ to gather data on these $C_i$ activities. At 260, program 175 predicts secondary incidents according to the historical data analysis and the real time data of the listed $C_i$. In an embodiment, the secondary incidents are predicted according to a quality score associated with real time activity data and incident prediction feedback factors. At 270 program 175 reports the predicted secondary incidents to the system administrator. Subject to the administrator's approval, program 175 executes remediation scripts to reduce or eliminate the affects of the predicted secondary incidents.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
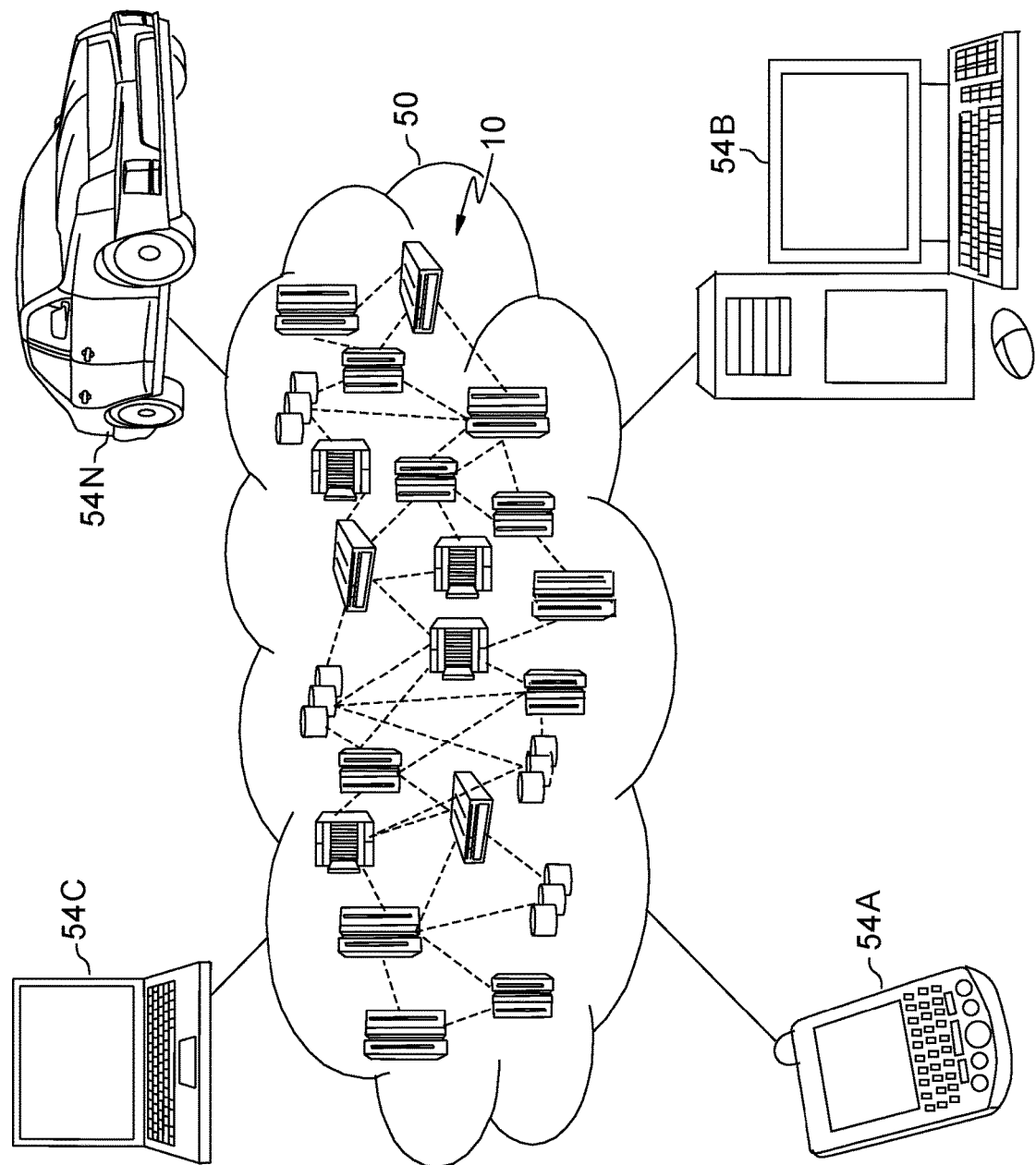
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and incident prediction program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for managing network asset incidents, the method comprising:
 receiving historical network asset incident data;
 analyzing the historical network asset incident data to correlate incident occurrence;
 receiving real time network asset incident data;
 in response to receiving the real time network asset incident data, generating a list of network assets predicted to be affected by a real time incident;
 generating a network asset incident prediction according to the historical data:
 decrementing an asset lifetime counter for network assets having inaccurate incident prediction:
 monitoring the list of network assets; and
 remediating a network incident for a listed network asset.

2. The computer implemented method according to claim 1, wherein the historical network asset incident data comprises timeline-based network incident data.

3. The computer implemented method according to claim 1, wherein the historical network asset incident data comprises network asset relationship data.

4. The computer implemented method according to claim 1, further comprising generating a list of network essential assets for monitoring.

5. The computer implemented method according to claim 1, wherein monitoring the list of network assets comprises executing asset monitoring scripts against listed network assets.

6. A computer program product for managing network asset incidents, the computer program product comprising one or more computer readable storage devices and stored program instructions on the one or more computer readable storage devices, the stored program instructions comprising:
 program instructions to receive historical network asset incident data;
 program instructions to analyze the historical network asset incident data to correlate incident occurrence;
 program instructions to receive real time network asset incident data;
 program instructions to generate a list of network assets predicted to be affected by a real time incident in response to receiving the real time network asset incident data;
 program instructions to generate a network asset incident prediction according to the historical data;
 program instructions to decrement an asset lifetime counter for network assets having inaccurate incident prediction;
 program instructions to monitor the list of network assets; and
 program instructions to remediate a network incident for a listed network asset.

7. The computer program product according to claim 6, wherein the historical network asset incident data comprises timeline-based network incident data.

8. The computer program product according to claim 6, wherein the historical network asset incident data comprises network asset relationship data.

9. The computer program product according to claim 6, further comprising program instructions to generate a list of network essential assets for monitoring.

10. The computer program product according to claim 6, wherein monitoring the list of network assets comprises executing asset monitoring scripts against listed network assets.

11. A computer system for managing network asset incidents, the computer system comprising:
 one or more computer processors;
 one or more computer readable storage devices; and
 stored program instructions on the one or more computer readable storage devices for execution by the one or more computer processors, the stored program instructions comprising:
  program instructions to receive historical network asset incident data;
  program instructions to analyze the historical network asset incident data to correlate incident occurrence;
  program instructions to receive real time network asset incident data;
  program instructions to generate a list of network assets predicted to be affected by a real time incident in response to receiving the real time network asset incident data;
  program instructions to generate a network asset incident prediction according to the historical data;
  program instructions to decrement an asset lifetime counter for network assets having inaccurate incident prediction;
  program instructions to monitor the list of network assets; and
  program instructions to remediate a network incident for a listed network asset.

12. The computer system according to claim 11, wherein the historical network asset incident data comprises timeline-based network incident data.

13. The computer system according to claim 11, wherein the historical network asset incident data comprises network asset relationship data.

14. The computer system according to claim 11, further comprising program instructions to generate a list of network essential assets for monitoring.

15. The computer system according to claim 11, wherein monitoring the list of network assets comprises executing asset monitoring scripts against listed network assets.

* * * * *